(12) United States Patent
Abe

(10) Patent No.: US 7,948,113 B2
(45) Date of Patent: May 24, 2011

(54) POWER SUPPLY MANAGEMENT SYSTEM

(75) Inventor: Kunihiro Abe, Higashimurayama (JP)

(73) Assignee: Denso Corporation, Kariya (JP)

( * ) Notice: Subject to any disclaimer, the term of this patent is extended or adjusted under 35 U.S.C. 154(b) by 350 days.

(21) Appl. No.: 12/219,596

(22) Filed: Jul. 24, 2008

(65) Prior Publication Data

US 2009/0026838 A1 Jan. 29, 2009

(30) Foreign Application Priority Data

Jul. 24, 2007 (JP) ................................ 2007-192111

(51) Int. Cl.
*H02J 1/00* (2006.01)
(52) U.S. Cl. ........................................................ 307/32
(58) Field of Classification Search ...................... 307/32
See application file for complete search history.

(56) References Cited

U.S. PATENT DOCUMENTS

| 6,292,741 | B1 * | 9/2001 | Bitzer et al. ................... 701/115 |
| 7,173,347 | B2 * | 2/2007 | Tani et al. ...................... 307/10.1 |
| 7,455,145 | B2 * | 11/2008 | Irikura et al. ................... 180/242 |
| 7,597,164 | B2 * | 10/2009 | Severinsky et al. ........ 180/65.27 |
| 2001/0030468 | A1 * | 10/2001 | Anderson et al. ................ 307/31 |
| 2004/0155624 | A1 | 8/2004 | Amano et al. |
| 2005/0063117 | A1 | 3/2005 | Amano et al. |

FOREIGN PATENT DOCUMENTS

| JP | A-2004-194364 | 7/2004 |
| JP | A-2006-88865 | 4/2006 |
| JP | 2007185048 A * | 7/2007 |
| JP | A-2007-185048 | 7/2007 |

OTHER PUBLICATIONS

Japanese Office Action issued on Jun. 2, 2009 for Japanese Patent Application No. 2007-192111.

* cited by examiner

*Primary Examiner* — Jared J Fureman
*Assistant Examiner* — Hal I Kaplan
(74) *Attorney, Agent, or Firm* — Oliff & Berridge, PLC

(57) ABSTRACT

A power supply management system includes means for detecting required electric power supply from electric loads installed in the motor vehicle, means for determining a distribution of amounts of the electric power to be distributed to the electric loads from an electric power resource in the motor vehicle based on the requirements of the supply of the electric power from the electric loads, and means for supplying one of amounts of the electric power to a corresponding one of the electric loads in accordance with the distribution of the amounts of the electric power.

43 Claims, 11 Drawing Sheets

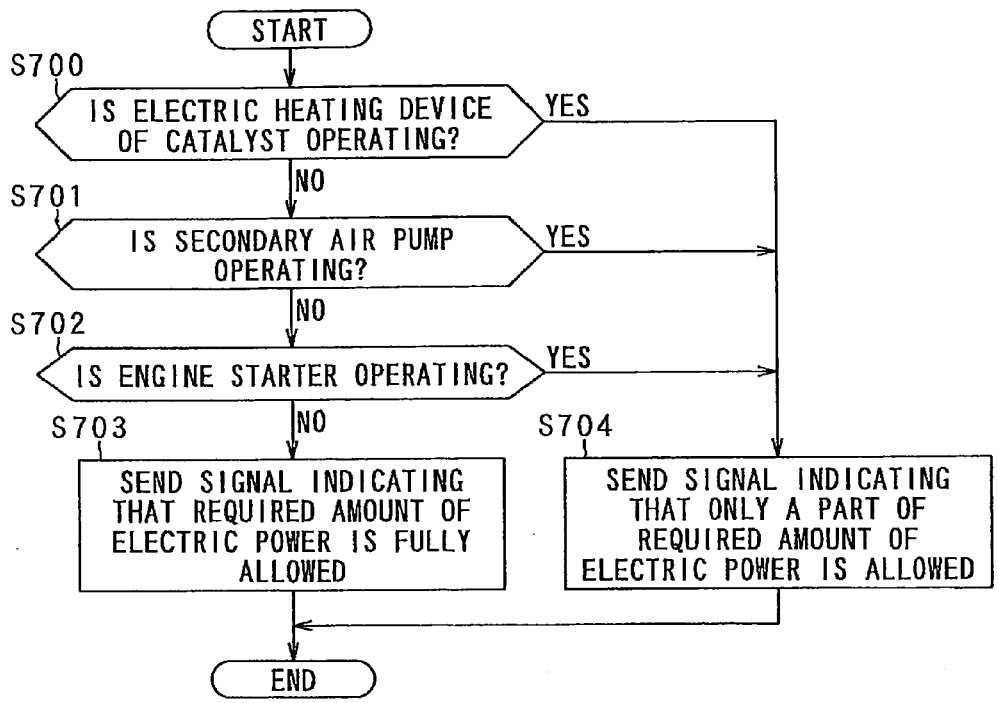
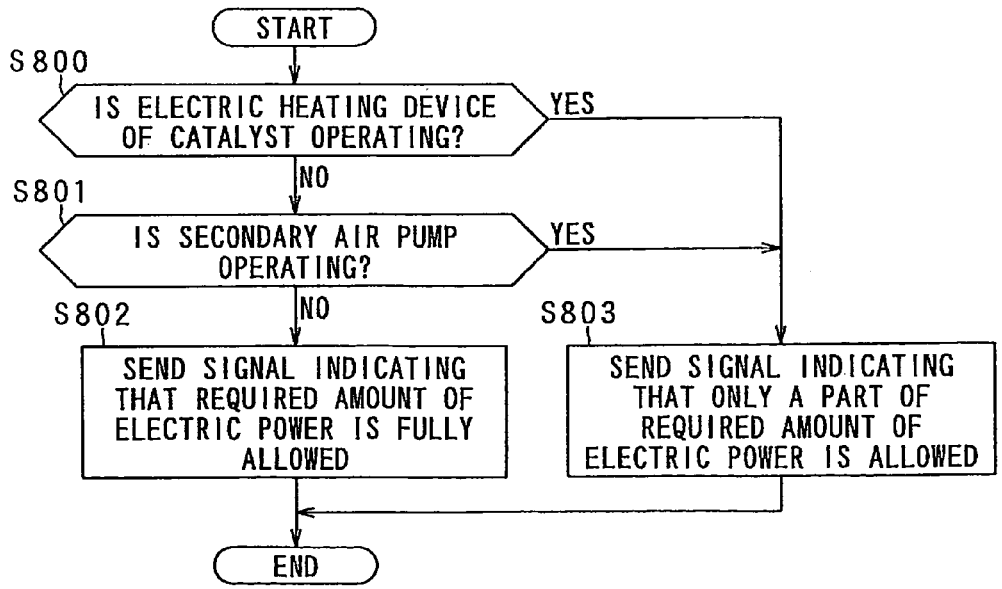

POWER SUPPLY MANAGEMENT SYSTEM

CROSS REFERENCE TO RELATED APPLICATION

The present application relates to and incorporated by reference Japanese Patent Application No. 2007-192111 filed on Jul. 24, 2007.

BACKGROUND OF THE INVENTION

1. The Field of the Invention

The present invention relates to a power supply management system that controls distribution of electric power to a plurality of electric loads installed in a motor vehicle, and in particular, to a power supply management system that limits supply of the electric power to one of the electric loads to reduce consumption of the electric power by the electric load.

2. Description of the Related Art

Recently, the electric loads of motor vehicles have been continuously increasing, because improvement of fuel economy of internal combustion engines in the motor vehicles and purification of exhaust gas emitted from the motor vehicles have been required from an environmental point of view, and electric equipment has replaced mechanical equipment, and new additional electric equipment, for example, navigation systems, and the like, have been installed in motor vehicles.

At the same time, some measures to cope with these situations have been proposed. For example, output electric currents generated by vehicle-mounted generators have been increased, and generation efficiency of the vehicle-mounted generators has been improved by utilizing 42 volt electrical systems. However, when a plurality of electrical equipments which consume a large electric power are simultaneously operated, it is hard to avoid lowering output voltage generated by the vehicle-mounted generators due to a shortage of output electric power generated by the vehicle-mounted generators.

A known power supply system that prevents output voltage generated by the vehicle-mounted generators from lowering is disclosed by Amano et al. in Japanese Patent Application Laid-Open No. 2004-194364. The power supply system of Amano et al. includes a power supply that includes an electric generator and a battery, and a power control unit that controls supply of electric power to an electric load from the power supply. The power control unit includes battery status sensing means for sensing the condition of the battery and load status sensing means for sensing the operating condition of the electric load, and has a function in which the variation of the output voltage of the electric power supplied from the power supply at the time when an operative requirement of the electric load is received by the power control unit is anticipated based on the condition of the battery and the operating condition of the electric load, and the electric current flowing from the power supply into the electric load is limited when the anticipated output voltage of the electric power is smaller than a predetermined value.

While the power supply system of Amano et al. includes a technique that limits the electric current flowing into the electric load taking into consideration of a level of the priority of the electric load and the electric current required to operate the electric load, the total balance of functions that are normally operated in the motor vehicle is not taken into consideration. In other words, when the available electric current is limited, loss of the total balance of functions in the motor vehicle, for example, deterioration of the normal functions of the motor vehicle, may occur. Further, the battery status sensing means for sensing the condition of the battery and the load status sensing means for sensing the operating condition of the electric load provided in the power supply system make the structure of the power supply system complex and result in a cost disadvantage that causes a rise in the manufacturing cost of the power supply system.

SUMMARY OF THE INVENTION

The present invention has been made to solve the above-mentioned problems, and therefore an object of the present invention is to provide a power supply management system that has a cost advantage and can reliably and stably supply electric power to electric loads without losing the total balance of functions in the motor vehicle or deterioration of the normal functions of the motor vehicle.

According to a first aspect of the present invention, there is provided a power supply management system including means for detecting operating conditions of electric loads installed in the motor vehicle to determine maximum amounts of electric power which is to be required by the electric loads to stably operate, means for determining a distribution of amounts of the electric power to be distributed to the electric loads from an electric power source in the motor vehicle based on the maximum amounts of electric power to be required by the electric loads, and means for supplying amounts of the electric power to the electric loads in accordance with the distribution of the amounts of the electric power to ensure electric power is stably distributed to the electric loads without losing total balance of functions in the motor vehicle or deterioration of normal functions of the motor vehicle.

According to a second aspect of the present invention, there is provided a power supply management system including the means for detecting the operating conditions of the electric loads installed in the motor vehicle to estimate the required electric power supply from the electric loads to determine the maximum amounts of electric power required by the electric loads to stably operate, the means for determining the distribution of the amounts of the electric power to be distributed to the electric loads from the electric power source in the motor vehicle based on the maximum amounts of electric power to be required by the electric loads, the means for supplying amounts of electric power to the electric loads in accordance with the distribution of the amounts of electric power, and means for restricting one of the amounts of the electric power distributed to a corresponding one of the electric loads based on the operating conditions of electric loads.

According to a third aspect of the present invention, there is provided a power supply management system including the means for detecting the operating conditions of the electric loads installed in the motor vehicle to determine the maximum amounts of electric power which is to be required by the electric loads to stably operate, the means for determining the distribution of the amounts of the electric power to be distributed to the electric loads from the electric power source in the motor vehicle based on the maximum amounts of electric power to be required by the electric loads, the means for supplying the amounts of the electric power to the electric loads in accordance with the distribution of the amounts of the electric power, and means for switching between a first mode of electric power supply operation in which the electric power is fed to the one of the electric loads and a second mode in which no electric power is fed to the one of the electric loads.

According to a fourth aspect of the present invention, there is provided a vehicle-mounted power supply management system wherein the motor vehicle includes a generator that generates electric power and a battery that connects to the generator and discharge the electric power, and two or more of a catalyst electric heating device, a secondary air pump, an engine starter, an electric hydraulic pump, an electric four wheel drive system, an electric power steering system, an electric deicer for a front windshield, an electric supercharger, and an electric air conditioner.

According to a fifth aspect of the present invention, there is provided a vehicle-mounted power supply management system in which the catalyst electric heating device, the secondary air pump, the engine starter, the electric hydraulic pump, the electric four wheel drive system, the electric power steering system, the electric deicer for the front windshield, the electric supercharger, and the electric air conditioner are indexed by levels of priority in this order from most to least important.

According to a sixth aspect of the present invention, there is provided a method for managing power supply in a motor vehicle including steps of: detecting operating conditions of the electric loads installed in the motor vehicle to determine required amounts of electric power required by the electric loads, determining amounts of the electric power to be distributed to the electric loads from an electric power source in the motor vehicle based on the operating conditions of the electric loads and the required amounts of electric power required by the electric loads, and supplying the electric power to the electric loads in accordance with the amounts of the electric power to be distributed to the electric loads.

According to a seventh aspect of the present invention, there is provided a method for managing power supply in the motor vehicle having electric loads including two or more of the catalyst electric heating device, the secondary air pump, the engine starter, the electric hydraulic pump, the electric four wheel drive system, the electric power steering system, the electric deicer for the front windshield, the electric supercharger, and the electric air conditioner which are indexed by levels of priority in this order from most to least important, the method including steps of: detecting operating conditions of the electric loads installed in the motor vehicle to determine the required amounts of the electric power required by the electric loads, determining amounts of the electric power to be distributed to the electric loads from the electric power source in the motor vehicle based on the operating conditions of the electric loads and the required amounts of electric power required by the electric loads, and supplying the electric power to the electric loads in accordance with the amounts of the electric power to be distributed to the electric loads.

According to an eight aspect of the present invention, there is provided a power supply management system for a motor vehicle comprising: means for determining electric loads being in an on-state, and means for calculating fractions of electric power allowed to be supplied from a power source mounted in the motor vehicle to the electric loads being in the on-state based on predetermined levels of priority for supply of the electric power to meet requests form the electric loads.

BRIEF DESCRIPTION OF THE DRAWINGS

The present invention will be understood more fully from the detailed description to be given hereinbelow and from the accompanying drawings of the preferred embodiment of the invention, which is not taken to limit the invention to the specific embodiments but should be recognized for the purpose of explanation and understanding only.

In the drawings:

FIG. 10 is a flow chart showing processes performed in an electric hydraulic pump subroutine;

FIG. 11 is a flow chart showing processes performed in an engine starter subroutine.

DESCRIPTION OF THE PREFERRED EMBODIMENTS

Figure 1:
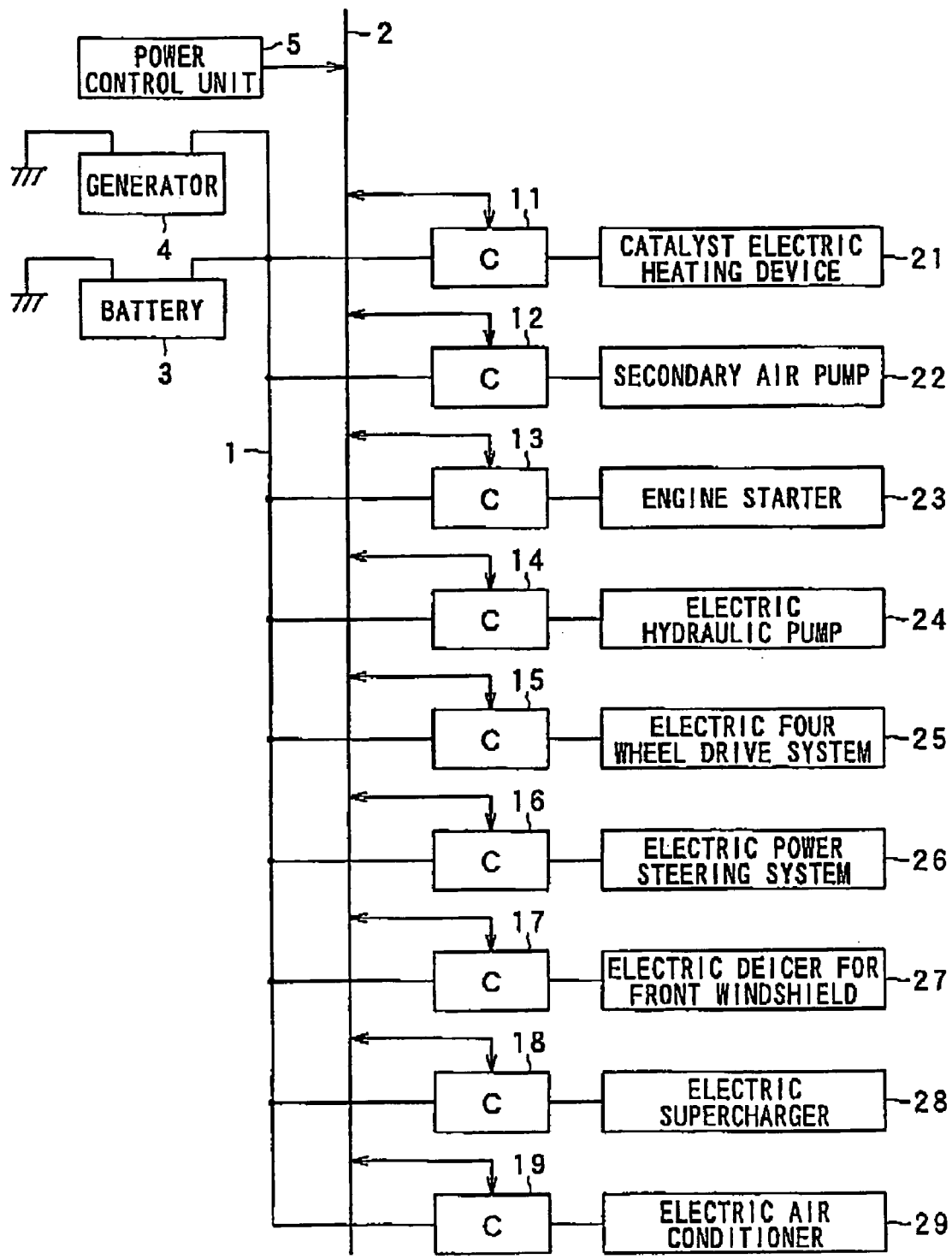
FIG. 1 is a diagram showing a power supply management system that controls supply of electric power to vehicle-mounted electric loads according to a first embodiment of the present invention, wherein the vehicle-mounted electric loads includes an catalyst electric heating device, a secondary air pump, an engine starter, an electric hydraulic pump, an electric four wheel drive system, an electric power steering system, an electric deicer for a front windshield, an electric supercharger, and an electric air conditioner.

Preferred embodiment of a control apparatus and method for an electric power steering system that transmits mechanical power from an electric motor to a steering system of a vehicle to reduce a required steering torque according to the present invention will be explained below with reference to attached drawings. Identical sections are denoted by the same reference numerals throughout the drawings. The following description of the preferred embodiment is merely exemplary in nature and is in no way intended to limit the invention, its application, or uses.

First Embodiment

Referring to FIGS. 1-11, a first embodiment of a power supply management system according to the present invention will be described.

FIG. 1 is a diagram showing a power supply management system that controls supply of electric power from power supplies 3-4 to vehicle-mounted electric loads (hereinafter it is simply referred to as "electric loads") 21-29 according to the first embodiment of the present invention. The power supply management system according to the present embodiment has the power supply 3-4, a power control unit 5, load controllers 11-19, and the electric loads 21-29. The power supply 3-4 for supplying electric power to the electric loads 21-29 has a battery 3 and a generator 4 that is driven by an engine of a motor vehicle (not shown). The electric power supplied from battery 3 and the generator 4 will be sometimes referred to as an electric power resource. Each of the load controllers 11-19 is arranged between the power supply 3-4 and the respective electric loads 21-29.

The power supply 3-4 and the electric loads 21-29 are connected via an electric power supply line 1. The electric power supply line 1 is provided to supply the electric power to each of the electric loads 21-29.

The power control unit 5 and the electric loads 21-29 are connected via a communication line 2. When each of the electric loads 21-29 is driven by respective electric control unit (not shown), the communication line 2 is provided to connect the respective electric control unit to the each of the electric loads 21-29 and is used in interactive communications between the respective electric control unit and electric load 21-29.

The electric loads 21-29 includes an catalyst electric heating device 21, a secondary air pump 22, an engine starter 23, an electric hydraulic pump 24, an electric four wheel drive system 25, an electric power steering system 26, an electric deicer for a front windshield 27, an electric supercharger 28, and an electric air conditioner 29.

The catalyst electric heating device 21 is installed in an exhaust pipe of the engine of the motor vehicle and has a heater that is disposed on a support of the catalyst or is located at an upstream side of the support of the catalyst. The catalyst electric heating device 21 heats up the catalyst to increase speed of activation of the catalyst when the electric power is supplied. The catalyst electric heating device 21 is connected to the electric power supply line 1 and one of the load controllers 11 is inserted between the electric power supply line 1 and the catalyst electric heating device 21. This controller 11 controls supply of the electric power to the catalyst electric heating device 21 based on information which is obtained by interactive communications between the one of the load controllers 11 and the power control unit 5. This load controller 11 issues a request signal to the power control unit 5 via the communication line 2, in which distribution of the electric power from the power supply 3-4 is required for the catalyst electric heating device 21, when the catalyst electric heating device 21 needs to be energized. Further the load controller 11 controls supply of the electric power from the power supply 3-4 to the catalyst electric heating device 21 based on an answer signal that is outputted from the power control unit 5 and contains an answer to the request from the load controller 11.

The secondary air pump 22 introduces atmospheric air into the exhaust pipe of the engine to accelerate burning of the hydrocarbon (HC) in the exhaust gas when the electric power is supplied. The secondary air pump 22 is connected to the electric power supply line 1 and one of the load controllers 12 is inserted between the electric power supply line 1 and the secondary air pump 22. The one of the load controllers 12 controls supply of the electric power to the secondary air pump 22 based on information which is obtained by interactive communications between the one of the load controllers 12 and the power control unit 5. The one of the load controllers 12 issues a request signal to the power control unit 5 via the communication line 2, in which distribution of the electric power from the power supply 3-4 is required for the secondary air pump 22 when the secondary air pump 22 needs to be energized. Further the load controller 12 controls supply of the electric power from the power supply 3-4 to the secondary air pump 22 based on an answer signal that that is outputted from the power control unit 5 and contains an answer to the request from the load controller 12.

The engine starter 23 has a motor to start to rotate the engine of the motor vehicle when the electric power is supplied, in particular, to restart to rotate the engine of the motor vehicle when the motor vehicle is in an idle state. The engine starter 23 is connected to the electric power supply line 1 and one of the load controllers 13 is inserted between the electric power supply line 1 and the engine starter 23. The one of the load controllers 13 controls supply of the electric power to the engine starter 23 based on information which is obtained by interactive communications between the one of the load controllers 13 and the power control unit 5. The one of the load controllers 13 issues a request signal to the power control unit 5 via the communication line 2, in which distribution of the electric power from the power supply 3-4 is required for the engine starter 23 when the engine starter 23 needs to be energized. Further the load controller 13 controls supply of the electric power from the power supply 3-4 to the engine starter 23 based on an answer signal that is outputted from the power control unit 5 and contains an answer to the request from the load controller 13.

The electric hydraulic pump 24 generates a hydraulic fluid pressure to a gear transmission mechanism when the electric power is supplied, in particular, when the motor vehicle is in the idle state. The electric hydraulic pump 24 is connected to the electric power supply line 1 and one of the load controllers 14 is inserted between the electric power supply line 1 and the electric hydraulic pump 24. The one of the load controllers 14 controls supply of the electric power to the electric hydraulic pump 24 based on information which is obtained by interactive communications between the one of the load controllers 14 and the power control unit 5. The one of the load controllers 14 issues a request signal to the power control unit 5 via the communication line 2, in which distribution of the electric power from the power supply 3-4 is required for the electric hydraulic pump 24 when the electric hydraulic pump 24 is need to be energized. Further the load controllers 14 controls supply of the electric power from the power supply 3-4 to the electric hydraulic pump 24 based on an answer signal that is outputted from the load controller 14 and contains an answer to the request from the power control unit 5.

The electric four wheel drive system 25 has a motor to drive at least one pair of pairs of front and rear wheels when the electric power is supplied. For example, the electric four wheel drive system 25 is of a simple type in which the front wheels are driven by the engine and the rear wheels are driven by the motor. The electric four wheel drive system 25 is connected to the electric power supply line 1 and one of the load controllers 15 is inserted between the electric power supply line 1 and the electric four wheel drive system 25. The one of the load controllers 15 controls supply of the electric power to the electric four wheel drive system 25 based on information which is obtained by interactive communications between the one of the load controllers 15 and the power control unit 5. The one of the load controllers 15 issues a request signal to the power control unit 5 via the communication line 2, in which distribution of the electric power from the power supply 3-4 is required for the electric four wheel drive system 25 when the electric four wheel drive system 25 needs to be energized. Further the load controller 15 controls supply of the electric power from the power supply 3-4 to the electric four wheel drive system 25 based on an answer signal that is outputted from the power control unit 5 and contains an answer to the request from the load controller 15.

The electric power steering system 26 has a motor to assist a steering operation of an operator of the motor vehicle when the electric power is supplied. The electric power steering system 26 includes not only of type in which an assist torque which is generated by the motor directly assists the steering operation of the operator of the motor vehicle, but also of type in which a hydraulic fluid pressure which is generated by the motor assists the steering operation of the operator of the motor vehicle, and of type in which steer-by-wire technology is adopted. In a steering system in which the steer-by-wire technology is installed, a steering column and a wheel of the motor vehicle are electrically connected. The electric power steering system 26 is connected to the electric power supply line 1 and one of the load controllers 16 is inserted between the electric power supply line 1 and the electric power steering system 26. The one of the load controllers 16 controls supply of the electric power to the electric power steering system 26 based on information which is obtained by interactive communications between the one of the load controllers 16 and the power control unit 5. The load controller 16 issues a request signal to the power control unit 5 via the communication line 2, in which distribution of the electric power from the power supply 3-4 is required for the electric power steering system 26 when the electric power steering system 26 needs to be energized. Further the load controller 16 controls supply of the electric power from the power supply 3-4 to the electric power steering system 26 based on an answer signal that is outputted from the power control unit 5 and contains an answer to the request from the load controller 16.

The electric deicer 27 for a front windshield has an electric heater deicing ice which is adhered on the front windshield and reduces a visibility of the operator of the vehicle when the electric power is supplied. The electric deicer 27 is widely used in cold districts or cold areas. The electric deicer 27 is connected to the electric power supply line 1 and one of the load controllers 17 is inserted between the electric power supply line 1 and the electric deicer 27. The one of the load controllers 17 controls supply of the electric power to the electric deicer 27 based on information which is obtained by interactive communications between the one of the load controllers 17 and the power control unit 5. The one of the load controllers 17 issues a request signal to the power control unit 5 via the communication line 2, in which distribution of the electric power from the power supply 3-4 is required for the electric deicer 27 when the electric deicer 27 is need to be energized. Further the load controller 17 controls supply of the electric power from the power supply 3-4 to the electric deicer 27 based on an answer signal that is outputted from the power control unit 5 and contains an answer to the request from the load controller 17.

The electric supercharger 28 is an electric air compressor which is installed in an air-intake system of the motor vehicle and compresses and forces air introduced by an electric air pump into the engine when the electric power is supplied. The electric supercharger 28 is allowed to be an exhaust gas turbine supercharger. The electric supercharger 28 is connected to the electric power supply line 1 and one of the load controllers 18 is inserted between the electric power supply line 1 and the electric supercharger 28. The one of the load controllers 18 controls supply of the electric power to the electric supercharger 28 based on information which is obtained by interactive communications between the one of the load controllers 18 and the power control unit 5. The load controller 18 issues a request signal to the power control unit 5 via the communication line 2, in which distribution of the electric power from the power supply 3-4 is required for the electric supercharger 28 when the electric supercharger 28 needs to be energized. Further the load controller 18 controls supply of the electric power from the power supply 3-4 to the electric supercharger 28 based on an answer signal that is outputted from the power control unit 5 and contains an answer to the request from the load controller 18.

The electric air conditioner 29 has a motor which compresses refrigerant and controls the state of air in an operating room of the motor vehicle when the electric power is supplied. For example, the electric air conditioner 29 is allowed to use a hybrid refrigerator that can be driven by waste heat and motive power generated by the engine. The electric air conditioner 29 is connected to the electric power supply line 1 and one of the load controllers 19 is inserted between the electric power supply line 1 and the electric air conditioner 29. The one of the load controllers 19 controls supply of the electric power to the electric air conditioner 29 based on information which is obtained by interactive communications between the one of the load controllers 19 and the power control unit 5. The load controller 19 issues a request signal to the power control unit 5 via the communication line 2, in which distribution of the electric power from the power supply 3-4 is required for the electric air conditioner 29 when the electric air conditioner 29 needs to be energized. Further the load controller 19 controls supply of the electric power from the power supply 3-4 to the electric air conditioner 29 based on an answer signal that is outputted from the power control unit 5 and contains an answer to the request from the load controller 19.

Figure 2:
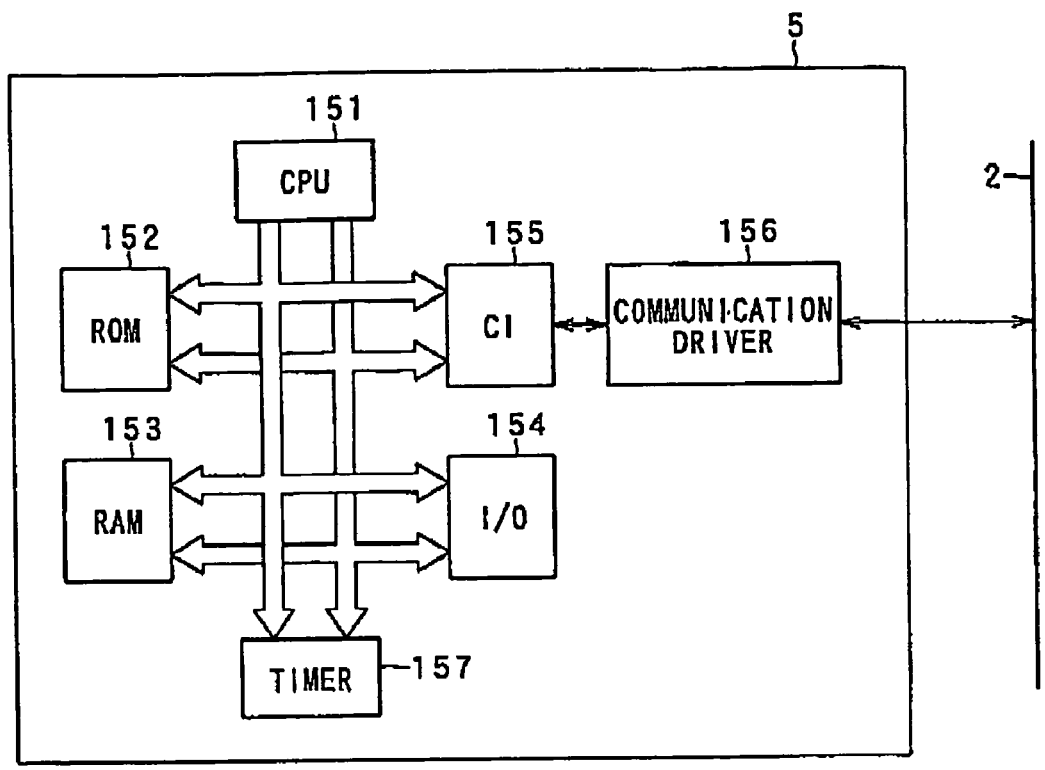
FIG. 2 is a diagram showing an arrangement of a power control unit according to the first embodiment.

FIG. 2 is a diagram showing an arrangement of the power control unit 5 according to the first embodiment.

The power control unit 5 includes a central processing unit (CPU) 151, a read only memory (ROM) 152, a random access memory (RAM) 153, input/output (I/O) unit 154, a communication interface (CI) 155, a communication driver 156, and timer 157 which consists of a microprocessor.

The CPU 151, the ROM 152, the RAM 153, the I/O unit 154, the CI 155, and timer 157 are interconnected via a bus. The CI 155 is connected to the communication line 2 via the communication driver 156.

Figure 3:
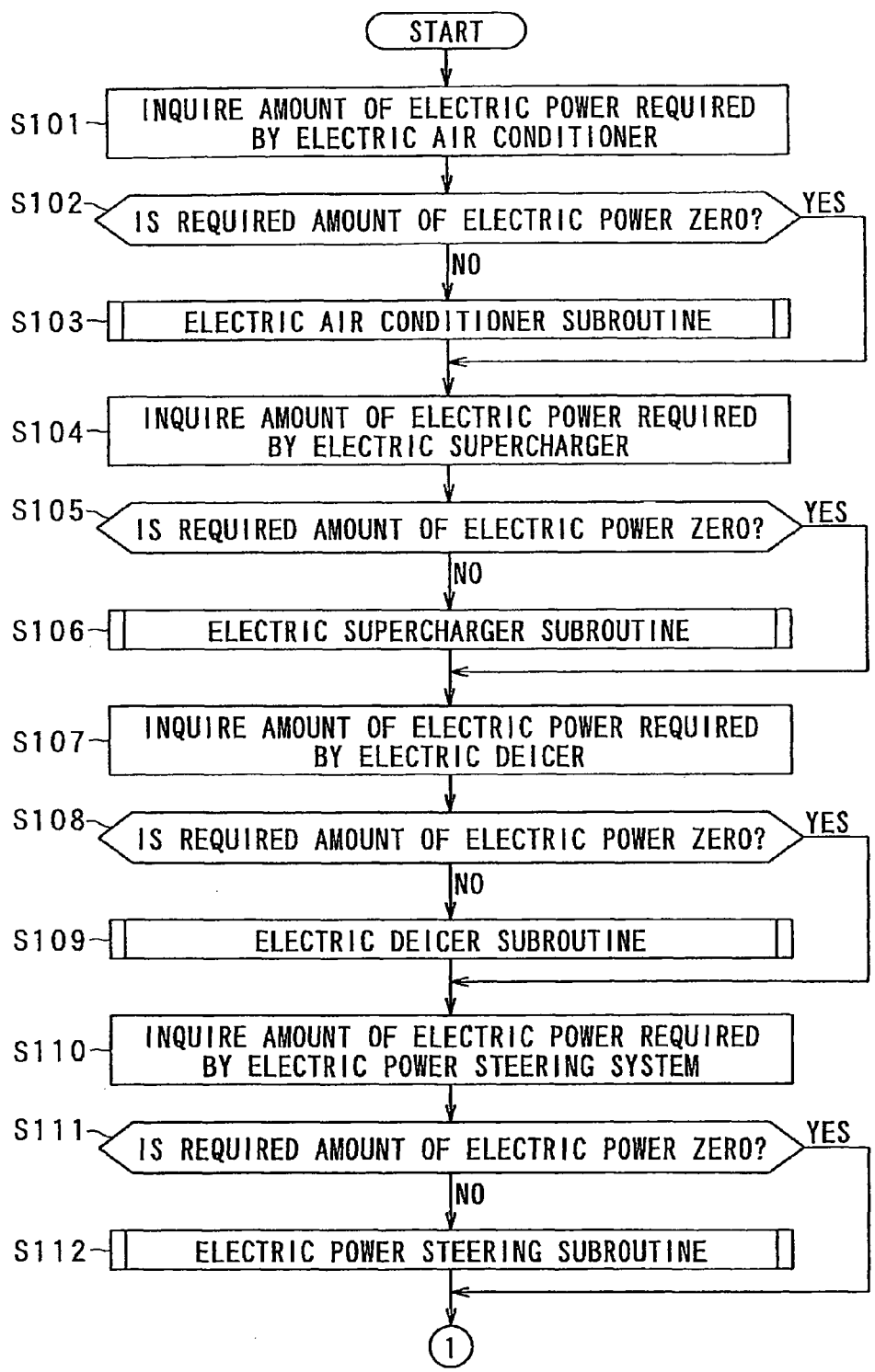
FIG. 3 is a flow chart showing a first half of processes performed by the power control unit according to the first embodiment.
Figure 4:
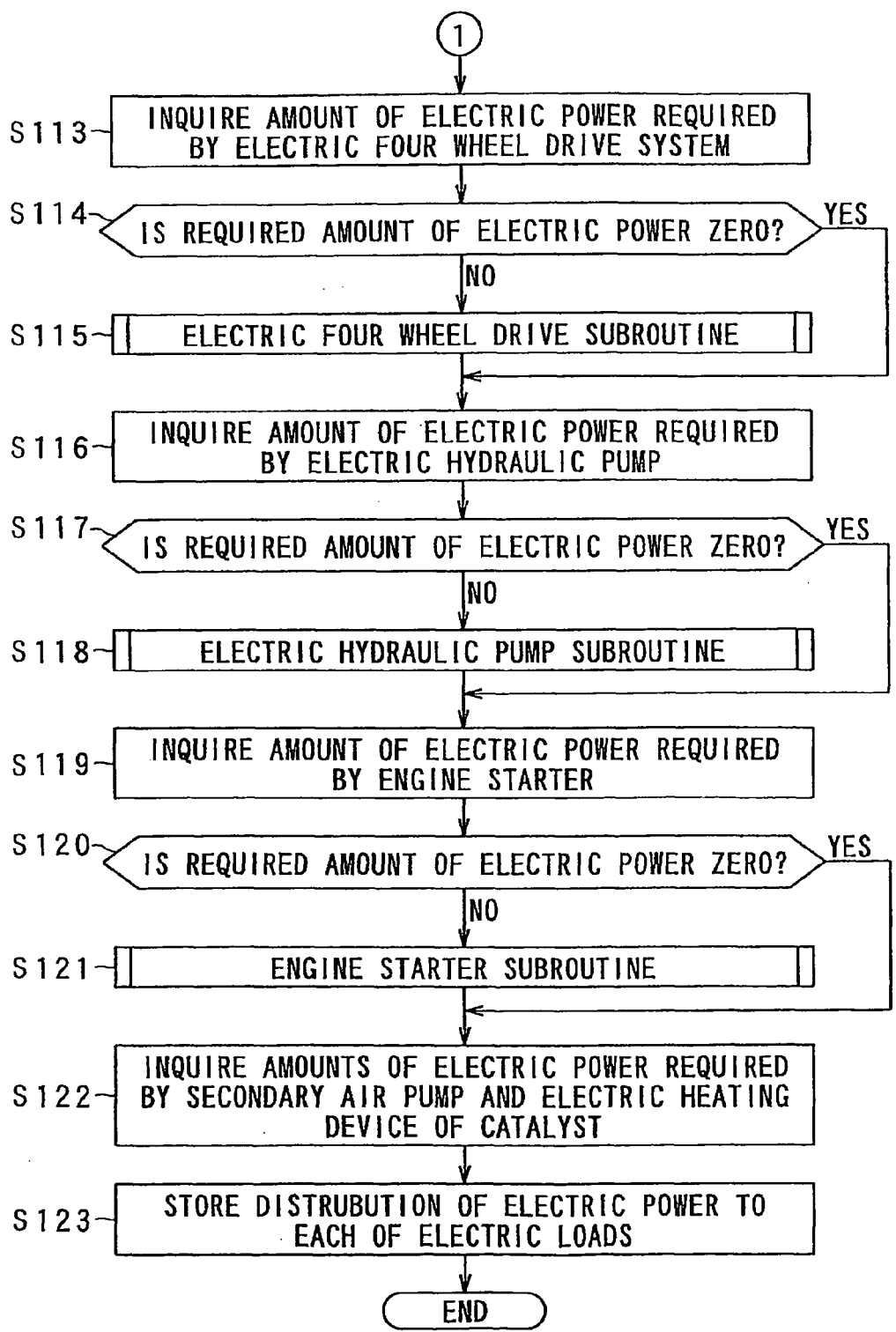
FIG. 4 is a flow chart showing a second half of the processes performed by the power control unit according to the first embodiment.

FIGS. 3-4 are a flow chart showing processes performed by the power control unit according to the first embodiment. The processes defined by the flow chart in FIGS. 3-4 are performed by the power control unit 5. This procedure starts and then repeats with a predetermined interval.

After start of the procedure, the power control unit 5 inquires whether or not the electric air conditioner 29 requires distribution of the electric power from the power supply 3-4 in step S101 of the controller 19 of the electric air conditioner 29 via the CI 155.

In step S102, it is determined whether or not a required value of the electric power of the electric air conditioner 29 is zero. If the required value of the electric power of the electric air conditioner 29 is zero, that is, the determination in step S102 is "YES", the procedure proceeds to step S104. If the required value of the electric power of the electric air conditioner 29 is not zero, that is, the determination in step S102 is "No", the power control unit 5 runs an electric air conditioner subroutine which will be defined in FIG. 5, and then makes the procedure proceeding to step S104.

In step S104, the power control unit 5 inquires whether or not the electric supercharger 28 requires distribution of the electric power from the power supply 3-4 of the controller 18 of the electric supercharger 28 via the CI 155.

Next, in step S105, it is determined whether or not a required value of the electric power of the electric supercharger 28 is zero. If the required value of the electric power of the electric supercharger 28 is zero, that is, the determination in step S104 is "YES", the procedure proceeds to step S107. If the required value of the electric power of the electric supercharger 28 is not zero, that is, the determination in step S104 is "No", the power control unit 5 runs an electric supercharger subroutine which will be defined in FIG. 6 in step S106, and then makes the procedure proceeding to step S107.

In step S107, the power control unit 5 inquires whether or not the electric deicer 27 requires distribution of the electric power from the power supply 3-4 of the controller 17 of the electric deicer 27 for the front windshield via the CI 155.

Next, in step S108, it is determined whether or not a required value of the electric power of the electric deicer 27 is zero. If the required value of the electric power of the electric deicer 27 is zero, that is, the determination in step S108 is "YES", the procedure proceeds to step S110. If the required value of the electric power of the electric deicer 27 is not zero, that is, the determination in step S108 is "No", the power control unit 5 runs an electric deicer subroutine which will be defined in FIG. 7 in step S109, and then makes the procedure continue to step S110.

In step S110, the power control unit 5 inquires whether or not the electric power steering system 26 requires distribution of the electric power from the power supply 3-4 of the controller 16 of the electric power steering system 26 via the CI 155.

Next, in step S111, it is determined whether or not a required value of the electric power of the electric power steering system 26 is zero. If the required value of the electric power of the electric power steering system 26 is zero, that is, the determination in step S111 is "YES", the procedure proceeds to step S113. If the required value of the electric power of the electric power steering system 26 is not zero, that is, the determination in step S111 is "No", the power control unit 5 runs an electric power steering subroutine which will be defined in FIG. 8 in step S112, and then makes the procedure continue to step S113.

In step S113, the power control unit 5 inquires whether or not the electric four wheel drive system 25 requires distribution of the electric power from the power supply 3-4 of the controller 15 of the electric four wheel drive system 25 via the CI 155.

Next, in step S114, it is determined whether or not a required value of the electric power of the electric four wheel drive system 25 is zero. If the required value of the electric power of the electric four wheel drive system 25 is zero, that is, the determination in step S114 is "YES", the procedure proceeds to step S116. If the required value of the electric power of the electric four wheel drive system 25 is not zero, that is, the determination in step S114 is "No", the power control unit 5 runs an electric four wheel drive subroutine which will be defined in FIG. 9 in step S115, and then makes the procedure continue to step S116.

In step S116, the power control unit 5 inquires whether or not the electric hydraulic pump 24 requires distribution of the electric power from the power supply 3-4 of the controller 14 of the electric hydraulic pump 24 via the CI 155.

Next, in step S117, it is determined whether or not a required value of the electric power of the electric hydraulic pump 24 is zero. If the required value of the electric power of the electric hydraulic pump 24 is zero, that is, the determination in step S117 is "YES", the procedure proceeds to step S119. If the required value of the electric power of the electric hydraulic pump 24 is not zero, that is, the determination in step S117 is "No", the power control unit 5 runs an electric hydraulic pump subroutine which will be defined in FIG. 10 in step S118, and then makes the procedure proceeding to step S119.

In step S119, the power control unit 5 inquires whether or not the engine starter 23 requires distribution of the electric power from the power supply 3-4 of the controller 13 of the engine starter 23 via the CI 155.

Next, in step S120, it is determined whether or not a required value of the electric power of the engine starter 23 is zero. If the required value of the electric power of the engine starter 23 is zero, that is, the determination in step S120 is "YES", the procedure proceeds to step S122. If the required value of the electric power of the engine starter 23 is not zero, that is, the determination in step S120 is "No", the power control unit 5 runs an engine starter subroutine which will be defined in FIG. 11 in step S121, and then makes the procedure continue to step S122.

In step S122, the power control unit 5 inquires whether or not the secondary air pump 22 or the catalyst electric heating device 21 require distribution of the electric power from the power supply 3-4 of the controller 12 of the secondary air pump 22 and the catalyst electric heating device 21 via the CI 155.

Next, in step S123, distribution of the electric power supplied from the power supply 3-4 to the electric loads 21-29 is determined based on the required values of the electric loads 21-29 and is stored in the RAM 153 of the power control unit 5. The distributed values of the electric loads 21-29 will be read in the next procedure. The step 123 is the last step in the processes shown in FIGS. 3-4. Thus, after the process in step S123 is completed, the procedure will be finished.

Figure 5:
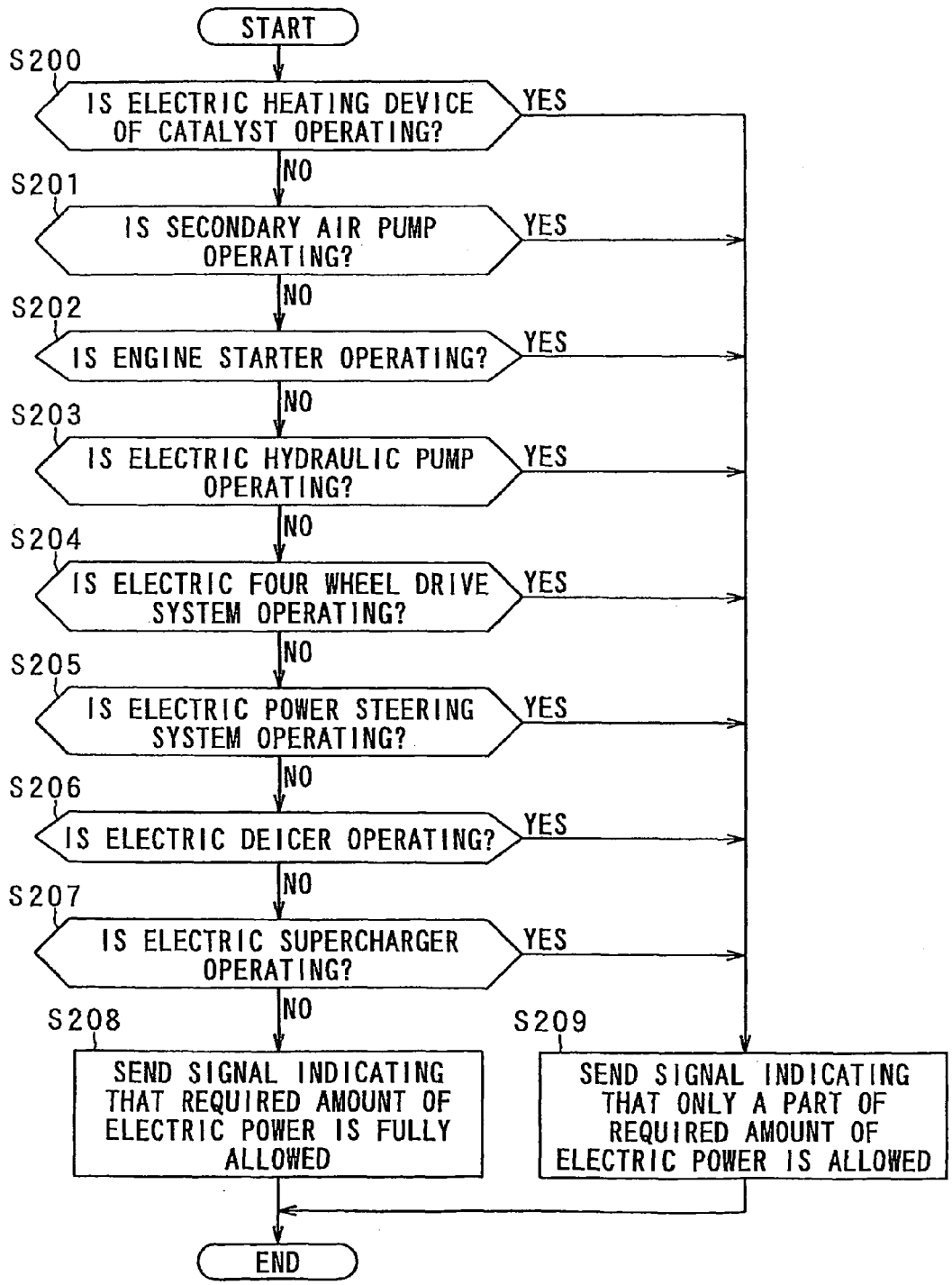
FIG. 5 is a flow chart showing processes performed in an electric air conditioner subroutine.

FIG. 5 is a flow chart showing processes performed in the electric air conditioner subroutine shown in step S103 of FIG. 3. In the electric air conditioner subroutine, operating conditions of the electric loads 21-28, that is, the catalyst electric heating device 21, the secondary air pump 22, the engine starter 23, the electric hydraulic pump 24, the electric four wheel drive system 25, the electric power steering system 26, the electric deicer for the front windshield 27, and the electric supercharger 28, are obtained based on the distribution of the electric power supplied from the power supply 3-4 to a part of the electric loads 21-28 and electric power to be supplied to the electric air conditioner 29 is determined based on the operating conditions of the part of the electric loads 21-28.

More specifically, first in step S200, it is determined whether or not the catalyst electric heating device 21 is operating. If the determination in step S200 is "Yes", the procedure proceeds to step S209. In contrast to this, if the determination in step S200 is "NO", the procedure proceeds to step S201.

Next, in step S201, it is determined whether or not the secondary air pump 22 is operating. If the determination in step S201 is "Yes", the procedure proceeds to step S209. In contrast to this, if the determination in step S201 is "NO", the procedure proceeds to step S202.

Next, in step S202, it is determined whether or not the engine starter 23 is operating. If the determination in step S202 is "Yes", the procedure proceeds to step S209. In contrast to this, if the determination in step S202 is "NO", the procedure proceeds to step S203.

Next, in step S203, it is determined whether or not the electric hydraulic pump 24 is operating. If the determination in step S203 is "Yes", the procedure proceeds to step S209. In contrast to this, if the determination in step S203 is "NO", the procedure proceeds to step S204.

Next, in step S204, it is determined whether or not the electric four wheel drive system 25 is operating. If the determination in step S204 is "Yes", the procedure proceeds to step S209. In contrast to this, if the determination in step S204 is "NO", the procedure proceeds to step S205.

Next, in step S205, it is determined whether or not the electric power steering system 26 is operating. If the determination in step S205 is "Yes", the procedure proceeds to step S209. In contrast to this, if the determination in step S205 is "NO", the procedure proceeds to step S206.

Next, in step S206, it is determined whether or not the electric deicer for the front windshield 27 is operating. If the determination in step S206 is "Yes", the procedure proceeds to step S209. In contrast to this, if the determination in step S206 is "NO", the procedure proceeds to step S207.

Next, in step S207, it is determined whether or not the electric supercharger 28 is operating. If the determination in step S207 is "Yes", the procedure proceeds to step S209. In contrast to this, if the determination in step S207 is "NO", the procedure proceeds to step S208.

If the procedure arrives at step S208, the power control unit 5 sends a signal to the load controllers 19 of the electric air conditioner 29, where the signal indicates the required electric power from the electric air conditioner 29 is fully allowed to be supplied from the power supply 3-4.

In step S209, the power control unit 5 sends a signal to one of the load controllers 19 of the electric air conditioner 29, where the signal indicates the required electric power from the electric air conditioner 29 is not fully allowed to be supplied from the power supply 3-4, that is, only a part of the required electric power for the electric air conditioner 29 is allowed to be supplied. In the latter case, it is preferable that an upper limit amount of the electric power to be supplied to the electric air conditioner 29 should be predetermined, and only the upper limit amount of the electric power will be supplied to the electric air conditioner 29. It is further preferable that an amount of the electric power to be supplied to the electric air conditioner 29 is determined based on the operating conditions of the electric loads 21-29.

Figure 6:
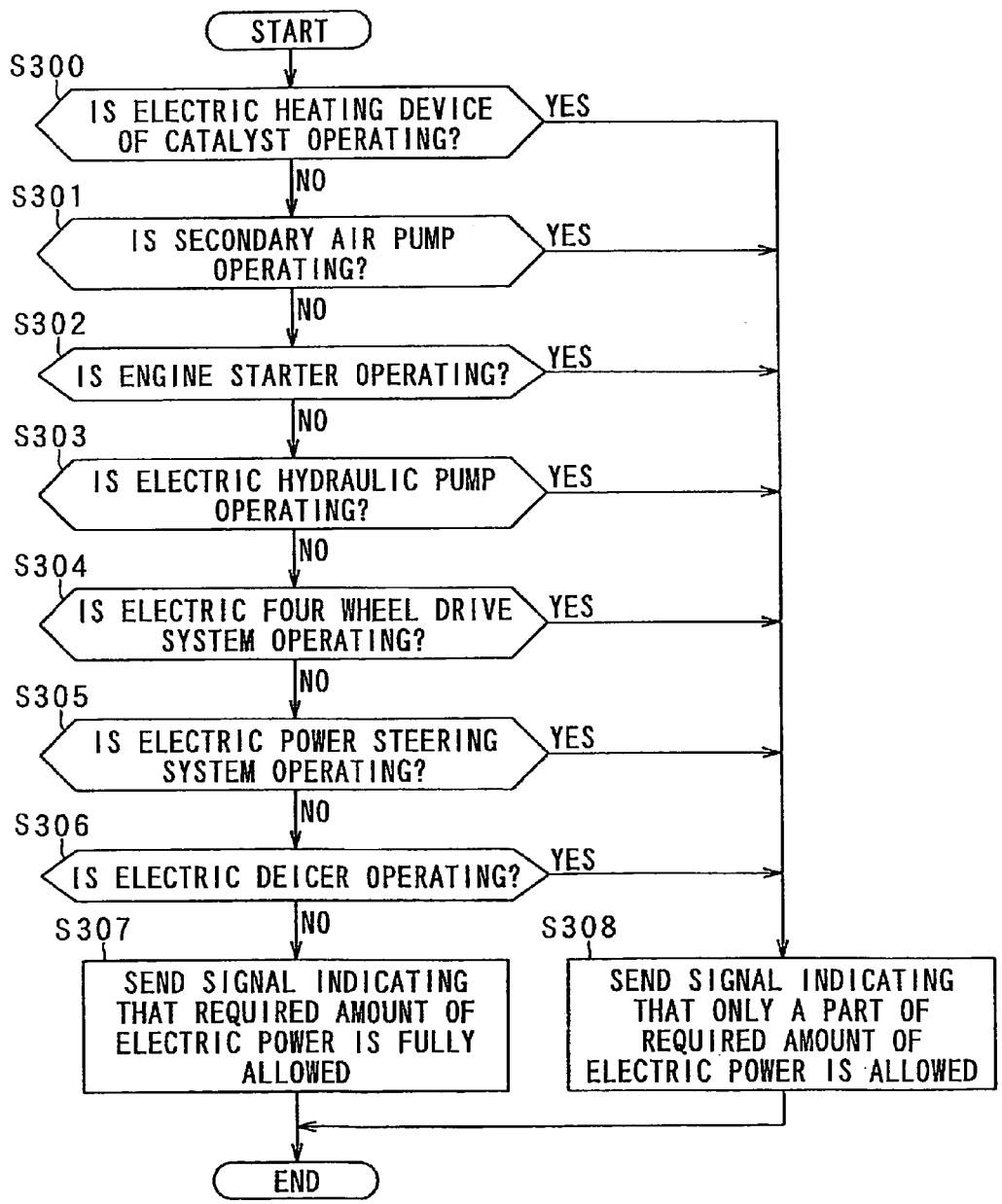
FIG. 6 is a flow chart showing processes performed in an electric supercharger subroutine.

FIG. 6 is a flow chart showing processes performed in the electric supercharger subroutine shown in step S106 of FIG. 3. In the electric supercharger subroutine, operating conditions of a part of the electric loads 21-27, that is, the catalyst electric heating device 21, the secondary air pump 22, the engine starter 23, the electric hydraulic pump 24, the electric four wheel drive system 25, the electric power steering system 26, and the electric deicer for the front windshield 27, are obtained based on the distribution of the electric power supplied from the power supply 3-4 to the part of the electric loads 21-27 and electric power to be supplied to the electric supercharger 28 is determined based on the operating conditions of the electric loads 21-27.

More specifically, first in step S300, it is determined whether or not the catalyst electric heating device 21 is operating. If the determination in step S300 is "Yes", the procedure proceeds to step S308. In contrast to this, if the determination in step S300 is "NO", the procedure proceeds to step S301.

Next, in step S301, it is determined whether or not the secondary air pump 22 is operating. If the determination in step S301 is "Yes", the procedure proceeds to step S308. In contrast to this, if the determination in step S301 is "NO", the procedure proceeds to step S302.

Next, in step S302, it is determined whether or not the engine starter 23 is operating. If the determination in step S302 is "Yes", the procedure proceeds to step S308. In contrast to this, if the determination in step S302 is "NO", the procedure proceeds to step S303.

Next, in step S303, it is determined whether or not the electric hydraulic pump 24 is operating. If the determination in step S303 is "Yes", the procedure proceeds to step S308. In contrast to this, if the determination in step S303 is "NO", the procedure proceeds to step S304.

Next, in step S304, it is determined whether or not the electric four wheel drive system 25 is operating. If the determination in step S304 is "Yes", the procedure proceeds to step S308. In contrast to this, if the determination in step S304 is "NO", the procedure proceeds to step S305.

Next, in step S305, it is determined whether or not the electric power steering system 26 is operating. If the determination in step S305 is "Yes", the procedure proceeds to step S308. In contrast to this, if the determination in step S305 is "NO", the procedure proceeds to step S306.

Next, in step S306, it is determined whether or not the electric deicer for the front windshield 27 is operating. If the determination in step S306 is "Yes", the procedure proceeds to step S308. In contrast to this, if the determination in step S306 is "NO", the procedure proceeds to step S307.

If the procedure arrives at step S307, the power control unit 5 sends a signal to the load controllers 18 of the electric supercharger 28, where the signal indicates the required electric power from the electric supercharger 28 is fully allowed to be supplied from the power supply 3-4.

In step S308, the power control unit 5 sends a signal to one of the load controllers 18 of the electric supercharger 28, where the signal indicates the required electric power from the electric supercharger 28 is not fully allowed to be supplied from the power supply 3-4, that is, only a part of the required electric power from the electric supercharger 28 is allowed to be supplied. In the latter case, it is preferable that an upper limit amount of the electric power to be supplied to the electric supercharger 28 should be predetermined, and only the upper limit amount of the electric power will be supplied to the electric supercharger 28. It is further preferable that an amount of the electric power to be supplied to the electric supercharger 28 is determined based on the operating conditions of the electric loads 21-26.

Figure 7:
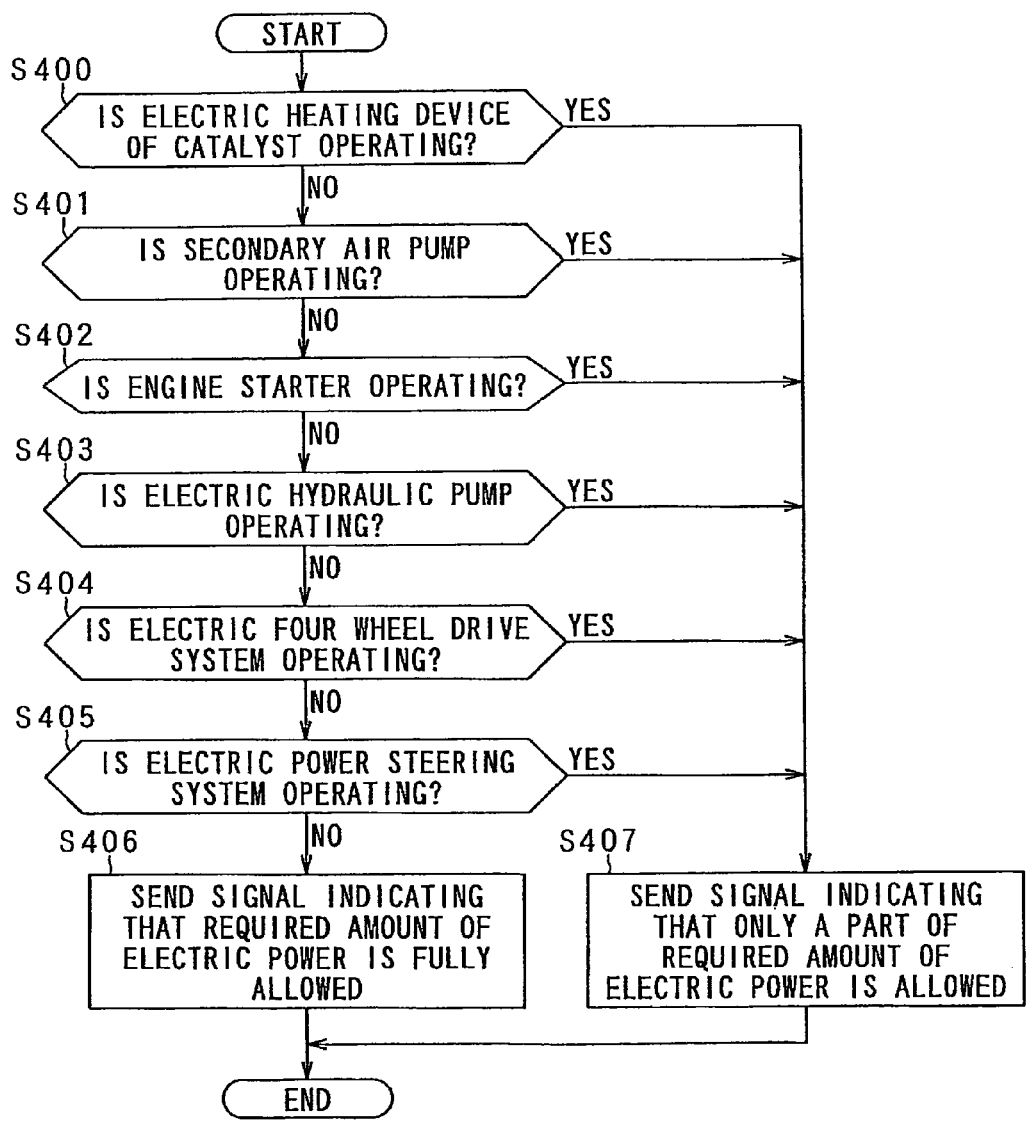
FIG. 7 is a flow chart showing processes performed in an electric deicer subroutine.

FIG. 7 is a flow chart showing processes performed in the electric deicer subroutine shown in step S109 of FIG. 3. In the electric deicer subroutine, operating conditions of a part of the electric loads 21-26, that is, the catalyst electric heating device 21, the secondary air pump 22, the engine starter 23, the electric hydraulic pump 24, the electric four wheel drive system 25, and the electric power steering system 26, are obtained based on the distribution of the electric power supplied from the power supply 3-4 to the part of the electric loads 21-26 and electric power to be supplied to the electric deicer 27 is determined based on the operating conditions of the electric loads 21-26.

More specifically, first in step S400, it is determined whether or not the catalyst electric heating device 21 is operating. If the determination in step S400 is "Yes", the procedure proceeds to step S407. In contrast to this, if the determination in step S400 is "NO", the procedure proceeds to step S401.

Next, in step S401, it is determined whether or not the secondary air pump 22 is operating. If the determination in step S401 is "Yes", the procedure proceeds to step S407. In contrast to this, if the determination in step S401 is "NO", the procedure proceeds to step S402.

Next, in step S402, it is determined whether or not the engine starter 23 is operating. If the determination in step S402 is "Yes", the procedure proceeds to step S407. In contrast to this, if the determination in step S402 is "NO", the procedure proceeds to step S403.

Next, in step S403, it is determined whether or not the electric hydraulic pump 24 is operating. If the determination in step S303 is "Yes", the procedure proceeds to step S407. In contrast to this, if the determination in step S403 is "NO", the procedure proceeds to step S404.

Next, in step S404, it is determined whether or not the electric four wheel drive system 25 is operating. If the determination in step S404 is "Yes", the procedure proceeds to step S407. In contrast to this, if the determination in step S404 is "NO", the procedure proceeds to step S405.

Next, in step S405, it is determined whether or not the electric power steering system 26 is operating. If the determination in step S405 is "Yes", the procedure proceeds to step S407. In contrast to this, if the determination in step S405 is "NO", the procedure proceeds to step S406.

If the procedure arrives at step S406, the power control unit 5 sends a signal to the load controllers 17 of the electric deicer 27, where the signal indicates the required electric power from the electric deicer 27 is fully allowed to be supplied from the power supply 3-4.

In step S407, the power control unit 5 sends a signal to one of the load controllers 17 of the electric deicer 27, where the signal indicates the required electric power from the electric deicer 27 is not fully allowed to be supplied from the power supply 3-4, that is, only a part of the required electric power from the electric deicer 27 is allowed to be supplied. In the latter case, it is preferable that an upper limit amount of the electric power to be supplied to the electric deicer 27 should be predetermined, and only the upper limit amount of the electric power will be supplied to the electric deicer 27. It is further preferable that an amount of the electric power to be supplied to the electric deicer 27 is determined based on the operating conditions of the electric loads 21-26.

Figure 8:
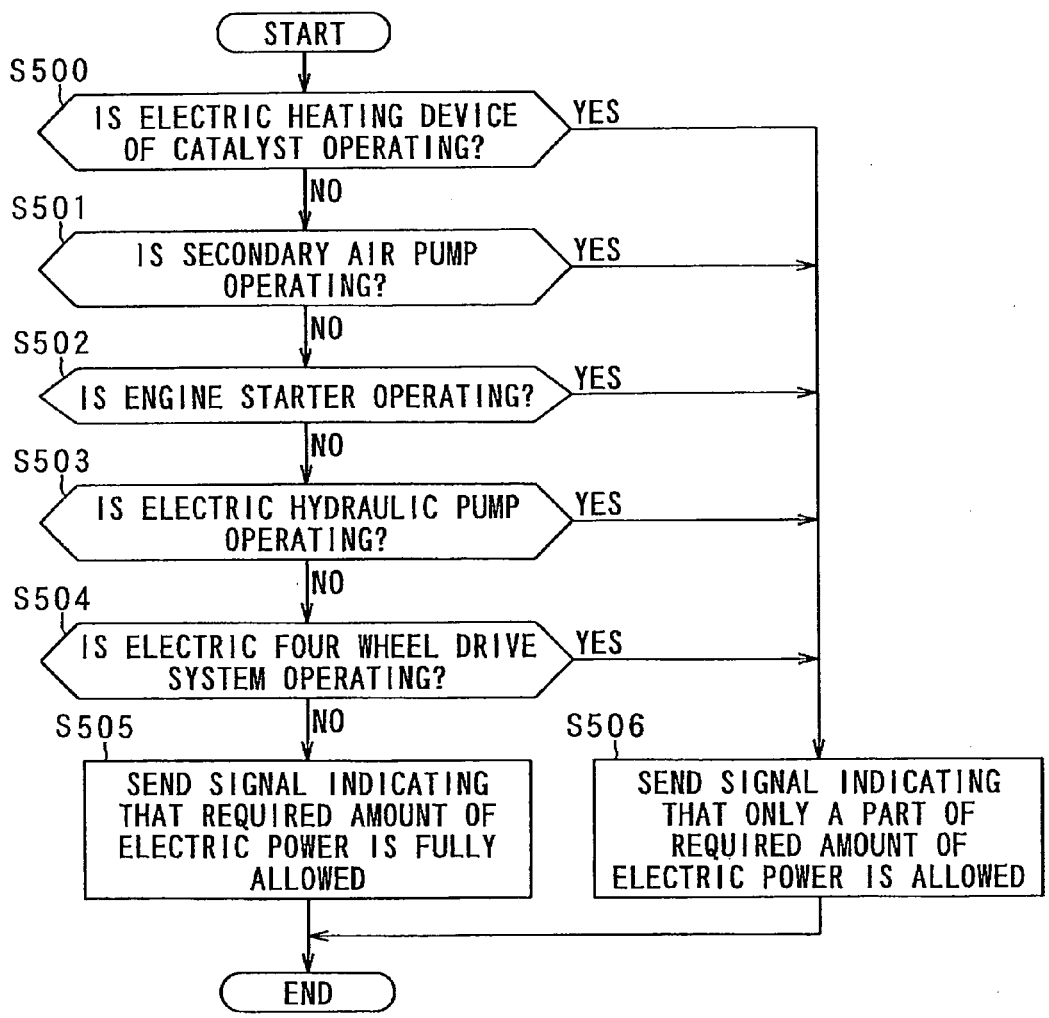
FIG. 8 is a flow chart showing processes performed in an electric power steering subroutine.

FIG. 8 is a flow chart showing processes performed in the electric power steering subroutine shown in step 112 of FIG. 3. In the electric power steering subroutine, operating conditions of the electric loads 21-25, that is, the catalyst electric heating device 21, the secondary air pump 22, the engine starter 23, the electric hydraulic pump 24, and the electric four wheel drive system 25, are obtained based on the distribution of the electric power supplied from the power supply 3-4 to the part of the electric loads 21-25 and electric power to be supplied to the electric power steering system 26 is determined based on the operating conditions of the electric loads 21-25.

More specifically, first in step S500, it is determined whether or not the catalyst electric heating device 21 is operating. If the determination in step S500 is "Yes", the procedure proceeds to step S506. In contrast to this, if the determination in step S500 is "NO", the procedure proceeds to step S501.

Next, in step S501, it is determined whether or not the secondary air pump 22 is operating. If the determination in step S501 is "Yes", the procedure proceeds to step S506. In contrast to this, if the determination in step S501 is "NO", the procedure proceeds to step S502.

Next, in step S502, it is determined whether or not the engine starter 23 is operating. If the determination in step S502 is "Yes", the procedure proceeds to step S506. In contrast to this, if the determination in step S502 is "NO", the procedure proceeds to step S503.

Next, in step S503, it is determined whether or not the electric hydraulic pump 24 is operating. If the determination in step S303 is "Yes", the procedure proceeds to step S506. In contrast to this, if the determination in step S503 is "NO", the procedure proceeds to step S504.

Next, in step S504, it is determined whether or not the electric four wheel drive system 25 is operating. If the determination in step S504 is "Yes", the procedure proceeds to step S506. In contrast to this, if the determination in step S504 is "NO", the procedure proceeds to step S505.

If the procedure arrives at step S505, the power control unit 5 sends a signal to one of the load controllers 16 of the electric power steering system 26, where the signal indicates the required electric power from the electric power steering system 26 is fully allowed to be supplied from the power supply 3-4.

In step S506, the power control unit 5 sends a signal to the load controllers 16 of the electric power steering system 26, where the signal indicates the required electric power from the electric power steering system 26 is not fully allowed to be supplied from the power supply 3-4, that is, only a part of the required electric power from the electric power steering system 26 is allowed to be supplied. In the latter case, it is preferable that an upper limit amount of the electric power to be supplied to the electric power steering system 26 should be predetermined, and only the upper limit amount of the electric power will be supplied to the electric power steering system 26. It is further preferable that an amount of the electric power to be supplied to the electric power steering system 26 is determined based on the operating conditions of the electric loads 21-25.

Figure 9:
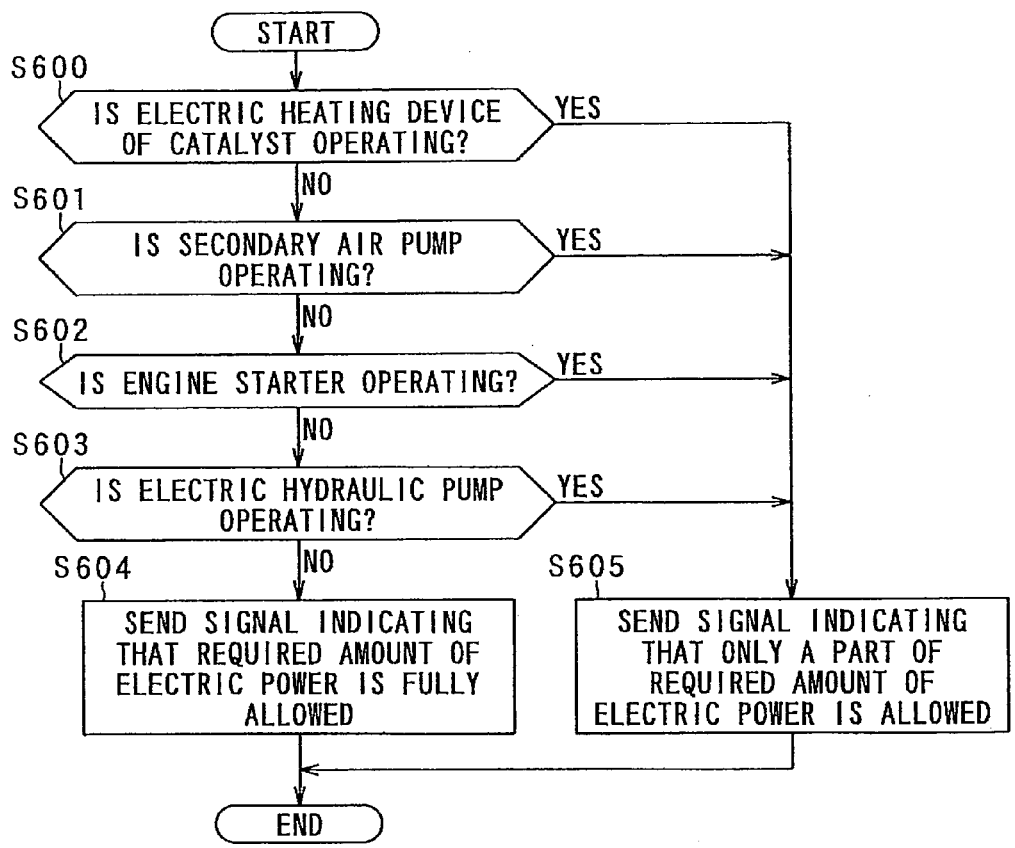
FIG. 9 is a flow chart showing processes performed in an electric four wheel drive subroutine.

FIG. 9 is a flow chart showing processes performed in the electric four wheel drive subroutine shown in step S115 of FIG. 4. In the electric four wheel drive subroutine, operating conditions of the electric loads 21-24, that is, the catalyst electric heating device 21, the secondary air pump 22, the engine starter 23, and the electric hydraulic pump 24, are obtained based on the distribution of the electric power supplied from the power supply 3-4 to the electric loads 21-24 and electric power to be supplied to the electric four wheel drive system 25 is determined based on the operating conditions of the electric loads 21-24.

More specifically, first in step S600, it is determined whether or not the catalyst electric heating device 21 is operating. If the determination in step S600 is "Yes", the procedure proceeds to step S605. In contrast to this, if the determination in step S600 is "NO", the procedure proceeds to step S601.

Next, in step S601, it is determined whether or not the secondary air pump 22 is operating. If the determination in step S601 is "Yes", the procedure proceeds to step S605. In contrast to this, if the determination in step S601 is "NO", the procedure proceeds to step S602.

Next, in step S602, it is determined whether or not the engine starter 23 is operating. If the determination in step S602 is "Yes", the procedure proceeds to step S605. In contrast to this, if the determination in step S602 is "NO", the procedure proceeds to step S603.

Next, in step S603, it is determined whether or not the electric hydraulic pump 24 is operating. If the determination in step S303 is "Yes", the procedure proceeds to step S605. In contrast to this, if the determination in step S603 is "NO", the procedure proceeds to step S604.

If the procedure arrives at step S604, the power control unit 5 sends a signal to the load controllers 15 of the electric four wheel drive system 25, where the signal indicates the required electric power from the electric four wheel drive system 25 is fully allowed to be supplied from the power supply 3-4.

In step S605, the power control unit 5 sends a signal to one of the load controllers 15 of the electric four wheel drive system 25, where the signal indicates the required electric power for the electric four wheel drive system 25 is not fully allowed to be supplied from the power supply 3-4, that is, only a part of the required electric power from the electric four wheel drive system 25 is allowed to be supplied. In the latter case, it is preferable that an upper limit amount of the electric power to be supplied to the electric four wheel drive system 25 should be predetermined, and only the upper limit amount of the electric power will be supplied to the electric four wheel drive system 25. It is further preferable that an amount of the electric power to be supplied to the electric four wheel drive system 25 is determined based on the operating conditions of the electric loads 21-24.

FIG. 10 is a flow chart showing processes performed in the electric hydraulic pump subroutine shown in step S118 of FIG. 4. In the electric hydraulic pump subroutine, operating conditions of the electric loads 21-23, that is, the catalyst electric heating device 21, the secondary air pump 22, and the engine starter 23, are obtained based on the distribution of the electric power supplied from the power supply 3-4 to the electric loads 21-23 and electric power to be supplied to the electric hydraulic pump 24 is determined based on the operating conditions of the electric loads 21-23.

More specifically, first in step S700, it is determined whether or not the catalyst electric heating device 21 is operating. If the determination in step S700 is "Yes", the procedure proceeds to step S704. In contrast to this, if the determination in step S700 is "NO", the procedure proceeds to step S701.

Next, in step S701, it is determined whether or not the secondary air pump 22 is operating. If the determination in step S701 is "Yes", the procedure proceeds to step S704. In contrast to this, if the determination in step S701 is "NO", the procedure proceeds to step S702.

Next, in step S702, it is determined whether or not the engine starter 23 is operating. If the determination in step S702 is "Yes", the procedure proceeds to step S704. In contrast to this, if the determination in step S702 is "NO", the procedure proceeds to step S703.

If the procedure arrives at step S703, the power control unit 5 sends a signal to the load controllers 14 of the electric hydraulic pump 24, where the signal indicates the required electric power from the electric hydraulic pump 24 is fully allowed to be supplied from the power supply 3-4.

In step S704, the power control unit 5 sends a signal to one of the load controllers 14 of the electric hydraulic pump 24, where the signal indicates the required electric power from the electric hydraulic pump 24 is not fully allowed to be supplied from the power supply 3-4, that is, only a part of the required electric power for the electric hydraulic pump 24 is allowed to be supplied. In the latter case, it is preferable that an upper limit amount of the electric power to be supplied to the electric hydraulic pump 24 should be predetermined, and only the upper limit amount of the electric power will be supplied to the electric hydraulic pump 24. It is further preferable that an amount of the electric power to be supplied to the electric hydraulic pump 24 is determined based on the operating conditions of the part of the electric loads 21-23.

FIG. 11 is a flow chart showing processes performed in the engine starter subroutine shown in step S121 of FIG. 4. In the engine starter subroutine, operating conditions of the electric loads 21-22, that is, the catalyst electric heating device 21 and the secondary air pump 22, are obtained based on the distribution of the electric power supplied from the power supply 3-4 to the electric loads 21-22 and electric power to be supplied to the engine starter 23 is determined based on the operating conditions of the electric loads 21-22.

More specifically, first in step S800, it is determined whether or not the catalyst electric heating device 21 is operating. If the determination in step S800 is "Yes", the procedure proceeds to step S803. In contrast to this, if the determination in step S800 is "NO", the procedure proceeds to step S801.

Next, in step S801, it is determined whether or not the secondary air pump 22 is operating. If the determination in step S801 is "Yes", the procedure proceeds to step S803. In contrast to this, if the determination in step S801 is "NO", the procedure proceeds to step S802.

Next, in step S802, it is determined whether or not the engine starter 23 is operating. If the determination in step S802 is "Yes", the procedure proceeds to step S803. In contrast to this, if the determination in step S802 is "NO", the procedure proceeds to step S802.

If the procedure arrives at step S802, the power control unit 5 sends a signal to the load controllers 13 of the engine starter 23, where the signal indicates the required electric power from the engine starter 23 is fully allowed to be supplied from the power supply 3-4.

In step S803, the power control unit 5 sends a signal to one of the load controllers 13 of the engine starter 23, where the signal indicates the required electric power from the engine starter 23 is not fully allowed to be supplied from the power supply 3-4, that is, only a part of the required electric power from the engine starter 23 is allowed to be supplied. In the latter case, it is preferable that an upper limit amount of the electric power to be supplied to the engine starter 23 should be predetermined, and only the upper limit amount of the electric power will be supplied to the engine starter 23. It is further preferable that an amount of the electric power to be supplied to the engine starter 23 is determined based on the operating conditions of the electric loads 21-22.

Each of the load controllers 11-19 controls the respective one of the electric loads 21-29 powered by the electric power whose amount is determined by the power control unit 5. That is, first, the power control unit 5 inquires to each of the load controllers 11-19 of whether or not the corresponding electric loads 21-29 require distribution of the electric power from the power supply 3-4. Then, the each of the load controllers 11-19 answers the respective inquiry to the power control unit 5. The power control unit 5 determines the respective amounts of the electric power supplied to the corresponding electric loads 21-29. Further, the power control unit 5 controls an amount of the electric power generated by the generator 4 and an amount of the electric power which is charged to or discharged from the battery 3.

Therefore, the power supply management system according to this embodiment of the present invention has a cost advantage and ensures stably to supply electric power to electric loads without losing the total balance of functions in the motor vehicle and deterioration of the normal functions of the motor vehicle. More detail, in the power supply management system according to this embodiment, each of the electric loads 21-29 is indexed by a level of priority. Allowance of supply of electric power to one of the electric loads 21-29 indexed by the higher level of the priority precedes to that to another one of the electric loads 21-29 indexed by the lower level of the priority in order to stabilize the total balance of functions in the motor vehicle and to prevent the normal functions of the motor vehicle from deteriorating. Hence, it is possible to minimize a part of the functions of the motor vehicle which should be stopped to prevent the total balance of functions in the motor vehicle from being lost.

Therefore, according to the first embodiment of the present invention, there is provided a power supply management system for a motor vehicle comprising: means for determining electric loads being in an on-state, and means for determining fractions of electric power allowed to be supplied from a power source mounted in the motor vehicle to the electric loads being in the on-state based on predetermined levels of priority for supply of the electric power to meet requests form the electric loads.

Second Embodiment

Figure 12:
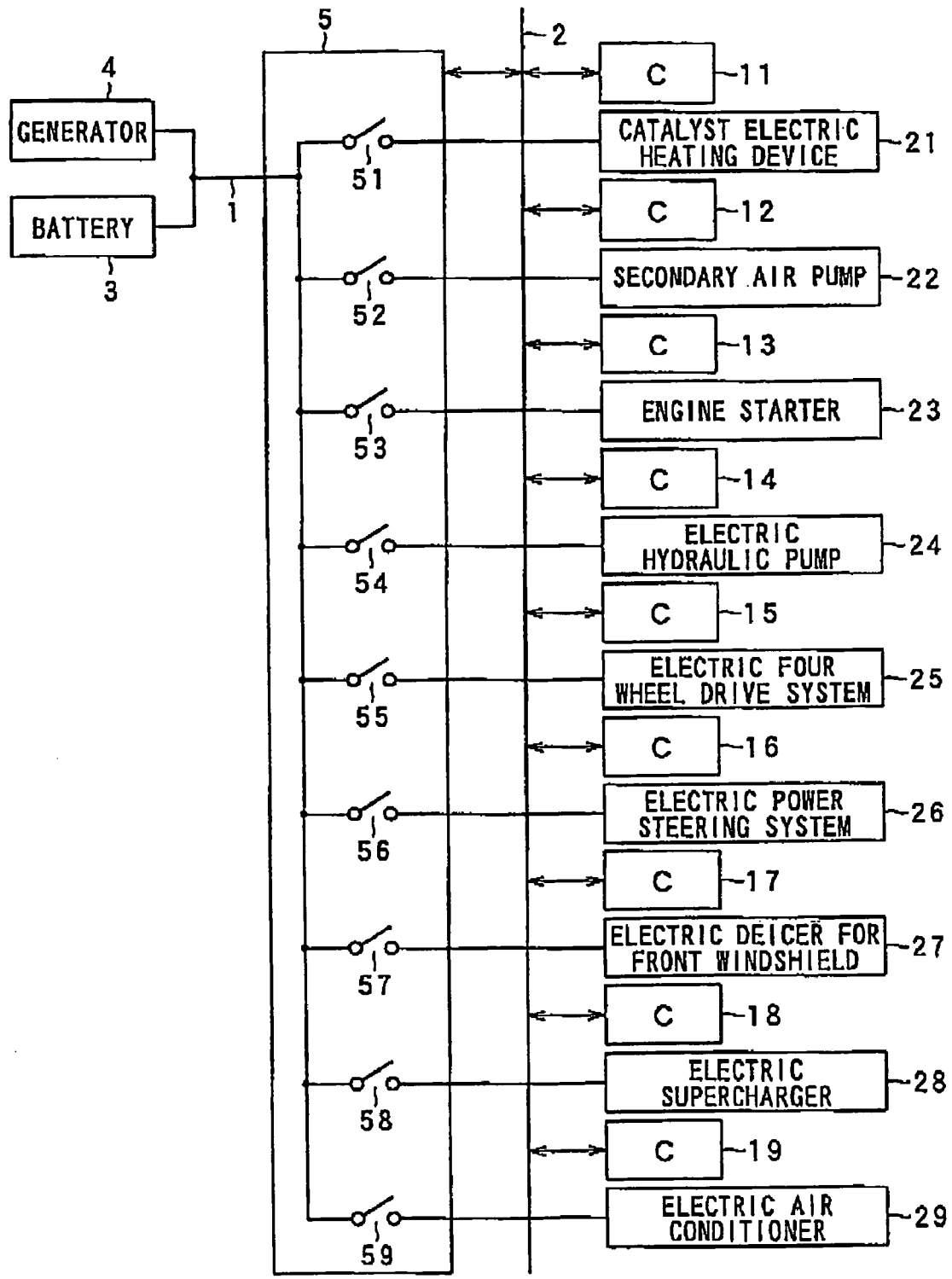
FIG. 12 is a diagram showing a power supply management system that controls supply of electric power to vehicle-mounted electric loads according to a second embodiment of the present invention, wherein the power supply management system includes respective operation switch between an electric power supply having a generator and a battery and each of the electric loads.

FIG. 12 is a diagram showing a power supply management system that controls supply of electric power to vehicle-mounted electric loads 21-29 according to a second embodiment of the present invention, wherein the power supply management system includes respective operation switch 51-59 between an electric power supply having the generator 4 and the battery 3 and each of the electric loads 21-29.

As shown in FIG. 12, each of operation switches 51-59 is inserted between the power supply 3-4 and the corresponding one of the electric loads 21-29. For example, one of the operation switches 51 is provided between the power supply 3-4 and the catalyst electric heating device 21. It is preferable that the operation switches 51-59 are included in the power control unit 5.

In this embodiment, first, each of the load controllers 11-19 sends a signal indicating a required amount of the electric power of a corresponding one of the electric loads 21-29 to the power control unit 5 via the communication line 2. After signals from the electric loads 21-29 are received by the power control unit 5, the power control unit 5 determines distribution of the electric power supplied to the electric loads 21-29 and directly controls the operation switches 51-59 to supply the electric power to the electric loads 21-29.

It is preferable that the power control unit 5 not only controls states of the operation switches 51-59, but also performs a pulse-width-modulation control for distributing the electric power to the electric loads 21-29 to control values of electric current flowing into the electric loads 21-29.

Further, it is possible that one of the operation switches 51-59 is installed in one of the load controllers 11-19. Further, some one of the load controllers 11-19 can be omitted. For example, because an operating state of the electric deicer 27 can be controlled using only an operation switch and a timer, one of the load controllers 17 for controlling the electric deicer 27 is not needed. In this case, the power control unit 5 can directly control the electric deicer 27.

Further, if all of the operation switches 51-59 are provided in the power control unit 5, only a simple cooling mechanism, for example, only one cooler is needed to refrigerate the operation switches 51-59.

Therefore, the power supply management system according to this embodiment of the present invention has a cost advantage and ensures stably to supply electric power to electric loads without losing the total balance of functions in the motor vehicle and deterioration of the normal functions of the motor vehicle.

MODIFICATIONS

In the above-mentioned embodiments, in each of the electric air conditioner subroutine, the electric supercharger subroutine, the electric deicer subroutine, the electric power steering subroutine, the electric four wheel drive subroutine, the electric hydraulic pump subroutine, and the engine starter subroutine, it is judged of whether or not one of the electric loads which has an upper level of the priority of the electric loads 21-29 is operating. However, it is preferable that operating conditions of all of the electric loads which are higher level of the priority than that of the subjected electric loads 21-29 in each of the subroutines would be monitored. Further, an amount of the electric power to be supplied to one of the electric loads 21-29 is determined based on the operating conditions of the all of the electric loads which are higher level of the priority than that of the subjected electric loads 21-29 in each of the subroutines.

Further, it is allowed that the load controllers 11-19 is configured to determine whether or not the corresponding electric load is in switch-on state. That is, each of the load controllers 11-19 determines the maximum amount of required electric power of the corresponding electric load. In this case, each of the load controllers 11-19 issues signal to the power control unit 5 to indicate the maximum amount of required electric power of the corresponding electric load. According to this configuration of the load controllers 11-19, the power supply management system has large cost advantage.

What is claimed is:

1. A power supply management system for a motor vehicle comprising:
    means for detecting operating conditions of electric loads to determine required amounts of electric power to be required by the electric loads, the electric loads having a priority thereamong;
    means for determining a distribution of amounts of the electric power to be distributed to the electric loads from an electric power source in the motor vehicle based on the required amounts of electric power from the electric loads;
    means for supplying amounts of the electric power to the electric loads in accordance with the distribution of the amounts of the electric power;
    means for determining whether a request for distributing the corresponding required amount of the electric power is sent from at least one of the electric loads;
    means for determining, when it is determined that the request for distributing the corresponding required amount of the electric power is sent from the at least one of the electric loads, whether an alternative electric load is higher in priority than the at least one electric load included in the electric loads and whether the alternative electric load is in an on-state; and
    means for restricting an amount of the electric power to be supplied to the at least one of the electric loads when it is determined that the alternative electric load is higher in priority than the at least one electric load included in the electric loads and the alternative electric load is in the on-state.

2. The power supply management system according to claim 1, further comprising:
    means for switching between a first mode of electric power supply operation in which the electric power is fed to the one of the electric loads and a second mode in which no electric power is fed to the one of the electric loads.

3. The power supply management system for the motor vehicle according to claim 1, wherein
    the motor vehicle includes a generator that generates electric power and a battery that connects to the generator and discharge the electric power, and two or more of:
        an catalyst electric heating device that is installed in an exhaust pipe of an internal combustion engine of the motor vehicle and has a heater that is disposed on a support of the catalyst or is located at an upstream side of the support of the catalyst and heats up the catalyst when the electric power is supplied;
        a secondary air pump that introduces atmospheric air into the exhaust pipe of the internal combustion engine when the electric power is supplied;

an engine starter that has a motor to start to rotate the
internal combustion engine when the electric power is
supplied;
an electric hydraulic pump that generates a hydraulic
fluid pressure to a gear transmission mechanism when
the electric power is supplied;
an electric four wheel drive system that has a motor to
drive at least one pair of pairs of front and rear wheels
when the electric power is supplied;
an electric power steering system that has a motor to
assist a steering operation of an operator of the motor
vehicle when the electric power is supplied;
an electric deicer for a front windshield that has an
electric heater deicing ice, which is adhered on the
front windshield and reduces a visibility of the operator of the vehicle, when the electric power is supplied;
an electric supercharger that is an electric air compressor
compressing and forcing air into the internal combustion engine when the electric power is supplied;
an electric air conditioner that at least has a motor which
drives an air compressor to control state of air in an
operating room of the motor vehicle when the electric
power is supplied, and
a first value of an amount of the electric power generated by
the generator and a second value of an amount the battery is charged or discharged, are controlled.

4. The power supply management system according to claim 3, wherein
the motor vehicle includes the catalyst electric heating device and the electric air conditioner, and
supply of the electric power to the catalyst electric heating device has priority over that to the electric air conditioner.

5. The power supply management system according to claim 3, wherein
the motor vehicle includes the secondary air pump and the electric air conditioner, and
supply of the electric power to the secondary air pump has priority over that to the electric air conditioner.

6. The power supply management system according to claim 3, wherein
the motor vehicle includes the engine starter and the electric air conditioner, and
supply of the electric power to the engine starter has priority over that to the electric air conditioner.

7. The power supply management system according to claim 3, wherein
the motor vehicle includes the electric hydraulic pump and the electric air conditioner, and
supply of the electric power to the electric hydraulic pump has priority over that to the electric air conditioner.

8. The power supply management system according to claim 3, wherein
the motor vehicle includes the electric four wheel drive system and the electric air conditioner, and
supply of the electric power to the electric four wheel drive system has priority over that to the electric air conditioner.

9. The power supply management system according to claim 3, wherein
the motor vehicle includes the electric power steering system and the electric air conditioner, and
supply of the electric power to the electric power steering system has priority over that to the electric air conditioner.

10. The power supply management system according to claim 3, wherein
the motor vehicle includes the electric deicer and the electric air conditioner, and
supply of the electric power to the electric deicer has priority over that to the electric air conditioner.

11. The power supply management system according to claim 3, wherein
the motor vehicle includes the electric supercharger and the electric air conditioner, and
supply of the electric power to the electric supercharger has priority over that to the electric air conditioner.

12. The power supply management system according to claim 3, wherein
the motor vehicle includes the catalyst electric heating device and the electric supercharger, and
supply of the electric power to the catalyst electric heating device has priority over that to the electric supercharger.

13. The power supply management system according to claim 3, wherein
the motor vehicle includes the secondary air pump and the electric supercharger, and
supply of the electric power to the secondary air pump has priority over that to the electric supercharger.

14. The power supply management system according to claim 3, wherein
the motor vehicle includes the engine starter and the electric supercharger, and
supply of the electric power to the engine starter has priority over that to the electric supercharger.

15. The power supply management system according to claim 3, wherein
the motor vehicle includes the electric hydraulic pump and the electric supercharger, and
supply of the electric power to the electric hydraulic pump has priority over that to the electric supercharger.

16. The power supply management system according to claim 3, wherein
the motor vehicle includes the electric four wheel drive system and the electric supercharger, and
supply of the electric power to the electric four wheel drive system has priority over that to the electric supercharger.

17. The power supply management system according to claim 3, wherein
the motor vehicle includes the electric power steering system and the electric supercharger, and
supply of the electric power to the electric power steering system has priority over that to the electric supercharger.

18. The power supply management system according to claim 3, wherein
the motor vehicle includes the electric deicer and the electric supercharger, and
supply of the electric power to the electric deicer has priority over that to the electric supercharger.

19. The power supply management system according to claim 3, wherein
the motor vehicle includes the catalyst electric heating device and the electric deicer, and
supply of the electric power to the catalyst electric heating device has priority over that to the electric deicer.

20. The power supply management system according to claim 3, wherein
the motor vehicle includes the secondary air pump and the electric deicer, and
supply of the electric power to the secondary air pump has priority over that to the electric deicer.

21. The power supply management system according to claim 3, wherein
the motor vehicle includes the engine starter and the electric deicer, and
supply of the electric power to the engine starter has priority over that to the electric deicer.

22. The power supply management system according to claim 3, wherein
the motor vehicle includes the electric hydraulic pump and the electric deicer, and
supply of the electric power to the electric hydraulic pump has priority over that to the electric deicer.

23. The power supply management system according to claim 3, wherein
the motor vehicle includes the electric four wheel drive system and the electric deicer, and
supply of the electric power to the electric four wheel drive system has priority over that to the electric deicer.

24. The power supply management system according to claim 3, wherein
the motor vehicle includes the electric power steering system and the electric deicer, and
supply of the electric power to the electric power steering system has priority over that to the electric deicer.

25. The power supply management system according to claim 3, wherein
the motor vehicle includes the catalyst electric heating device and the electric power steering, and
supply of the electric power to the catalyst electric heating device has priority over that to the electric power steering.

26. The power supply management system according to claim 3, wherein
the motor vehicle includes the secondary air pump and the electric power steering, and
supply of the electric power to the secondary air pump has priority over that to the electric power steering.

27. The power supply management system according to claim 3, wherein
the motor vehicle includes the engine starter and the electric power steering, and
supply of the electric power to the engine starter has priority over that to the electric power steering.

28. The power supply management system according to claim 3, wherein
the motor vehicle includes the electric hydraulic pump and the electric power steering, and
supply of the electric power to the electric hydraulic pump has priority over that to the electric power steering.

29. The power supply management system according to claim 3, wherein
the motor vehicle includes the electric four wheel drive system and the electric power steering, and
supply of the electric power to the electric four wheel drive system has priority over that to the electric power steering.

30. The power supply management system according to claim 3, wherein
the motor vehicle includes the catalyst electric heating device and the electric four wheel drive system, and
supply of the electric power to the catalyst electric heating device has priority over that to the electric four wheel drive system.

31. The power supply management system according to claim 3, wherein
the motor vehicle includes the secondary air pump and the electric four wheel drive system, and
supply of the electric power to the secondary air pump has priority over that to the electric four wheel drive system.

32. The power supply management system according to claim 3, wherein
the motor vehicle includes the engine starter and the electric four wheel drive system, and
supply of the electric power to the engine starter has priority over that to the electric four wheel drive system.

33. The power, supply management system according to claim 3, wherein
the motor vehicle includes the electric hydraulic pump and the electric four wheel drive system, and
supply of the electric power to the electric hydraulic pump has priority over that to the electric four wheel drive system.

34. The power supply management system according to claim 3, wherein
the motor vehicle includes the catalyst electric heating device and the electric hydraulic pump, and
supply of the electric power to the catalyst electric heating device has priority over that to the electric hydraulic pump.

35. The power supply management system according to claim 3, wherein
the motor vehicle includes the second air pump and the electric hydraulic pump, and
supply of the electric power to the secondary air pump has priority over that to the electric hydraulic pump.

36. The power supply management system according to claim 3, wherein
the motor vehicle includes the engine starter and the electric hydraulic pump, and
supply of the electric power to the engine starter has priority over that to the electric hydraulic pump.

37. The power supply management system according to claim 3, wherein
the motor vehicle includes the catalyst electric heating device and the engine starter, and
supply of the electric power to the catalyst electric heating device has priority over that to the engine starter.

38. The power supply management system according to claim 3, wherein
the motor vehicle includes the secondary air pump and the engine starter, and
supply of the electric power to the secondary air pump has priority over that to the engine starter.

39. The power supply management system according to claim 3, wherein
the motor vehicle includes the catalyst electric heating device, the secondary air pump, the engine starter, the electric hydraulic pump, the electric four wheel drive system the electric power steering system, the electric deicer for the front windshield, the electric supercharger, and the electric air conditioner, and
the catalyst electric heating device, the secondary air pump, the engine starter, the electric hydraulic pump, the electric four wheel drive system, the electric power steering system, the electric deicer for the front windshield, the electric supercharger, and the electric air conditioner are indexed by levels of priority in this order from most to least important.

40. A method for managing electric power supply to electric loads in a motor vehicle comprising the steps of:
detecting operating conditions of the electric loads installed in the motor vehicle to determine maximum amounts of electric power to be required by the electric loads, the electric loads having a priority thereamong;

determining amounts of the electric power to be distributed to the electric loads from an electric power source in the motor vehicle based on the operating conditions of the electric loads and the maximum amounts of electric power to be required by the electric loads;

supplying the electric power to the electric loads in accordance with the amounts of the electric power to be distributed to the electric loads;

determining whether a request for distributing the maximum amount of the electric power is sent from at least one of the electric loads;

determining, when it is determined that the request for distributing the maximum amount of the electric power is sent from the at least one of the electric loads, whether an alternative electric load is higher in priority than the at least one electric load included in the electric loads and whether the alternative electric load is in an on-state; and restricting an amount of the electric power to be supplied to the at least one of the electric loads when it is determined that the alternative electric load is higher in priority than the at least one electric load included in the electric loads and the alternative electric load is in the on-state.

41. The method according to claim 40, wherein the motor vehicle includes a catalyst electric heating device, a secondary air pump, an engine starter, an electric hydraulic pump, an electric four wheel drive system, an electric power steering system, an electric deicer for the front windshield, an electric supercharger, and an electric air conditioner, and the electric loads include two or more of the catalyst electric heating device, the secondary air pump, the engine starter, the electric hydraulic pump, the electric four wheel drive system, the electric power steering system, the electric deicer for the front windshield, the electric supercharger, and the electric air conditioner, and are indexed by levels of priority in this order using the included loads from most to least important, and the amounts of the electric power to be distributed to the electric loads from an electric power source are determined based on the levels of priority of the electric loads.

42. A power supply management system for a motor vehicle comprising:

means for determining which electric loads are in an on-state; and means for determining amounts of electric power allowed to be supplied from a power source mounted in the motor vehicle to the electric loads which are in the on-state, the electric loads having a priority thereamong;

means for determining whether a request for distributing the corresponding required amount of the electric power is sent from at least one of the electric loads which are in the on-state;

means for determining, when it is determined that the request for distributing the corresponding required amount of the electric power is sent from the at least one of the electric loads, whether an alternative electric load is higher in priority than the at least one electric load included in the electric loads which are in the on-state; and means for restricting an amount of the electric power to be supplied to the at least one of the electric loads when it is determined that the alternative electric load is higher in priority than the at least one electric load included in the electric loads which are in the on-state.

43. The power supply management system according to claim 42, wherein the predetermined levels of priority are assigned to the electric loads.

* * * * *